US006848440B2

(12) United States Patent
Han et al.

(10) Patent No.: US 6,848,440 B2
(45) Date of Patent: Feb. 1, 2005

(54) GRILL UNIT AND COOKING APPARATUS WITH THE SAME

(75) Inventors: Dae-Sung Han, Hwasung (KR); Chul Kim, Yongin (KR); Yong-Woon Han, Kunpo (KR); Seong-Deog Jang, Suwon (KR); Kyung-Hee Hahm, Seoul (KR); Joo-Yeong Yeo, Hwasung (KR); Han-Seong Kang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/659,380

(22) Filed: Sep. 11, 2003

(65) Prior Publication Data

US 2004/0154604 A1 Aug. 12, 2004

(30) Foreign Application Priority Data

Feb. 6, 2003 (KR) .................................. 10-2003-0007565

(51) Int. Cl.$^7$ .............................................. F24C 15/30
(52) U.S. Cl. .................................. 126/25 R; 126/152 B; 126/54
(58) Field of Search ............................. 126/25 R, 41 R, 126/152 B, 54; 165/135

(56) References Cited

U.S. PATENT DOCUMENTS

| 1,294,159 | A | * | 2/1919 | Potts .............................. 99/446 |
| 3,152,242 | A | | 10/1964 | De Mott | |
| 3,154,004 | A | | 10/1964 | Huck | |
| 4,632,089 | A | * | 12/1986 | Wardell ....................... 126/25 R |
| 5,020,512 | A | * | 6/1991 | Vago et al. .................. 122/18.2 |
| 5,189,945 | A | | 3/1993 | Hennick | |
| 6,167,797 | B1 | * | 1/2001 | Bollich ......................... 99/340 |
| 6,431,164 | B1 | * | 8/2002 | Wardell .......................... 126/5 |

FOREIGN PATENT DOCUMENTS

| FR | 2 670 274 | 6/1992 |
| GB | 2 286 111 | 8/1995 |

OTHER PUBLICATIONS

Japanese Abstract 2001–120440 dated May 8, 2001.
Japanese Abstract 11–267032 dated Oct. 5, 1999.
Japanese Abstract 2000–254007 dated Sep. 19, 2000.
Patent Abstract of Japan No. 2000–254007 dated Sep. 19, 2000.
Patent Abstracts of Japan Publication No. 2000–166771 dated Jun. 20, 2000.
Patent Abstract of Japan Publication No. 03–026216 dated Feb. 4, 1991.
Korean Patent Abstract Publication No. 2002–16089, Published Mar. 4, 2002.
U.S. Appl. No. 10/736,836, filed Dec. 17, 2003, Han et al., Samsung Electronics Co. Ltd.
U.S. Appl. No. 10/681,132, filed Oct. 9, 2003, Han et al., Samsung Electronics Co., Ltd.
U.S. Appl. No. 10/681,136, filed Oct. 9, 2003, Han et al., Samsung Electronics Co., Ltd.

(List continued on next page.)

Primary Examiner—Alfred Basichas
(74) Attorney, Agent, or Firm—Staas & Halsey LLP

(57) ABSTRACT

A grill unit having a plurality of grill pipes, each grill pipe having two ends; water tanks connected to both ends of the grill pipes to supply water to the grill pipes; and sound-proofing covers positioned around both ends of the grill pipes that are inserted into the water tanks. The grill unit allows water contained in grill pipes to continuously flow in any one direction, and prevents the generation of noise caused by water vapor discharged from the grill pipes to the water tanks.

23 Claims, 7 Drawing Sheets

OTHER PUBLICATIONS

U.S. Appl. No. 10/682,548, filed Oct. 10, 2003, Han et al., Samsung Electronics Co., Ltd.
U.S. Appl. No. 10/687,603, filed Oct. 20, 2003, Han et al., Samsung Electronics Co., Ltd.
U.S. Appl. No. 10/689,746, filed Oct. 22, 2003, Han et al., Samsung Electronics Co., Ltd.
U.S. Appl. No. 10/691,551, filed Oct. 24, 2003, Han et al., Samsung Electronics Co., Ltd.
U.S. Appl. No. 10/705,893, filed Nov. 13, 2003, Han et al., Samsung Electronics Co., Ltd.
U.S. Appl. No. 10/706,926, filed Nov. 14, 2003, Han et al., Samsung Electronics Co., Ltd.
U.S. Appl. No. 10/731,159, filed Nov. 17, 2003, Han et al., Samsung Electronics Co. Ltd.
European Search Report for corresponding application EP 03255738 dated Nov. 5, 2003.

* cited by examiner

001
GRILL UNIT AND COOKING APPARATUS WITH THE SAME

CROSS-REFERENCE TO RELATED APPLICATIONS

This application claims the benefit of Korean Application No. 2003-7565, filed Feb. 6, 2003, in the Korean Intellectual Property Office, the disclosure of which is incorporated herein by reference.

BACKGROUND OF THE INVENTION

1. Field of the Invention

The present invention relates, in general, to a grill unit and cooking apparatus with the same and, more particularly, to a grill unit and cooking apparatus with the same, which prevents noise from being generated during cooking.

2. Description of the Related Art

Generally, it is well known that meat or processed meat, such as sausage, is most delicious when grilled. Therefore, persons enjoy cooking meat or processed meat using a cooking apparatus with a grill unit and eating the cooked meat or processed meat.

The cooking apparatus for this kind of cooking includes a heating unit for directly applying heat to food, and a grill unit mounted on top of the heating unit to support food while spacing the food apart from the heating unit. This structure allows food put on the grill unit to be heated by heat transferred from the heating unit. However, when cooking is performed using the cooking apparatus equipped with a grill unit, high temperature heat is directly transferred from the heating unit to the grill unit, so the part of food in contact with the grill unit easily burns, thus deteriorating the taste of the food and negatively affecting the health of those eating the burned food.

SUMMARY OF THE INVENTION

It is an aspect of the present invention to provide a grill unit and cooking apparatus with the same, which allows water contained in grill pipes to continuously flow in one direction during cooking, thus minimizing the amount of water vapor generated in the grill pipes and preventing noise from being generated by water vapor discharged from the grill pipes to water tanks.

Additional aspects and/or advantages of the invention will be set forth in part in the description that follows and, in part, will be obvious from the description, or may be learned by practice of the invention.

To achieve the above and/or other aspects of the present invention, there is provided a grill unit including a plurality of grill pipes, each grill pipe having two ends; water tanks connected to both ends of the grill pipes to supply water to the grill pipes; and soundproofing covers positioned around both ends of the grill pipes that are inserted into the water tanks.

The one of the ends of each of the grill pipes is partially obstructed by a corresponding one of the projections while being spaced apart from the corresponding projection to enable water contained in each grill pipe to flow therein in one direction.

The ends of the plurality of grill pipes are alternately and partially obstructed by the corresponding projections, the plurality of projections being alternately arranged in both of the water tanks.

The grill pipes are formed in such a way that both ends of the grill pipes, which are open, face top surfaces of the water tanks; and the soundproofing covers each include a top surface opposite the open ends of the grill pipes to intercept water vapor discharged from the grill pipes, and at least one side surface downwardly bent and extended from an edge of each top surface by a predetermined length and open at a lower end thereof.

The grill pipes are formed in such a way that both ends of the grill pipes, which are open, face side surfaces of the water tanks; and the soundproofing covers each include a top surface positioned over upper surfaces of the ends of the grill pipes to intercept water vapor discharged from the grill pipes, and a side surface opposite the open ends of the grill pipes and open at a lower end thereof.

Each of the water tanks includes a cover installed on an open upper portion thereof to selectively open and close each of the water tanks.

Each of the soundproofing covers extends in a longitudinal direction to the water tanks. The ends of the plurality of grill pipes are inserted into the water tanks.

To achieve the above and/or other aspects of the present invention, there is provided a cooking apparatus with a grill unit, including a cabinet having at least one heater; and a grill unit mounted on a top surface of the cabinet to support food, the grill unit having a plurality of grill pipes, water tanks connected to both ends of the grill pipes to supply water to the grill pipes, and soundproofing covers positioned around both ends of the grill pipes that are inserted into the water tanks.

To achieve the above and/or other aspects according to the present invention, there is provided a grill unit including a plurality of grill pipes, each grill pipe having two ends; water tanks connected to both ends of the grill pipes to supply water to the grill pipes, both ends of the grill pipes facing side surfaces of the water tanks; and soundproofing covers positioned around both ends of the grill pipes that are inserted into the water tanks, the soundproofing covers each including a top surface positioned over upper surfaces of respective ends of the grill pipes to intercept water vapor discharged from the grill pipes, and a side surface opposite the respective ends of the grill pipes and open at a lower end thereof, wherein the grill pipes are prevented from overheating by allowing water to flow into the grill pipes from the water tanks, thereby preventing food contacting the grill pipes from burning when the grill pipes are heated and slowing an increase in temperature of the grill pipes to reduce an amount of water vapor generated, and wherein the soundproofing covers positioned around the ends of the grill pipes and spaced apart from the grill pipes prevent noise from being generated when water vapor, which is produced in the grill pipes when water in the grill pipes boils, discharges to the water tanks at a discharge pressure.

These, together with other aspects and/or advantages that will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and/or other aspects and advantages of the invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
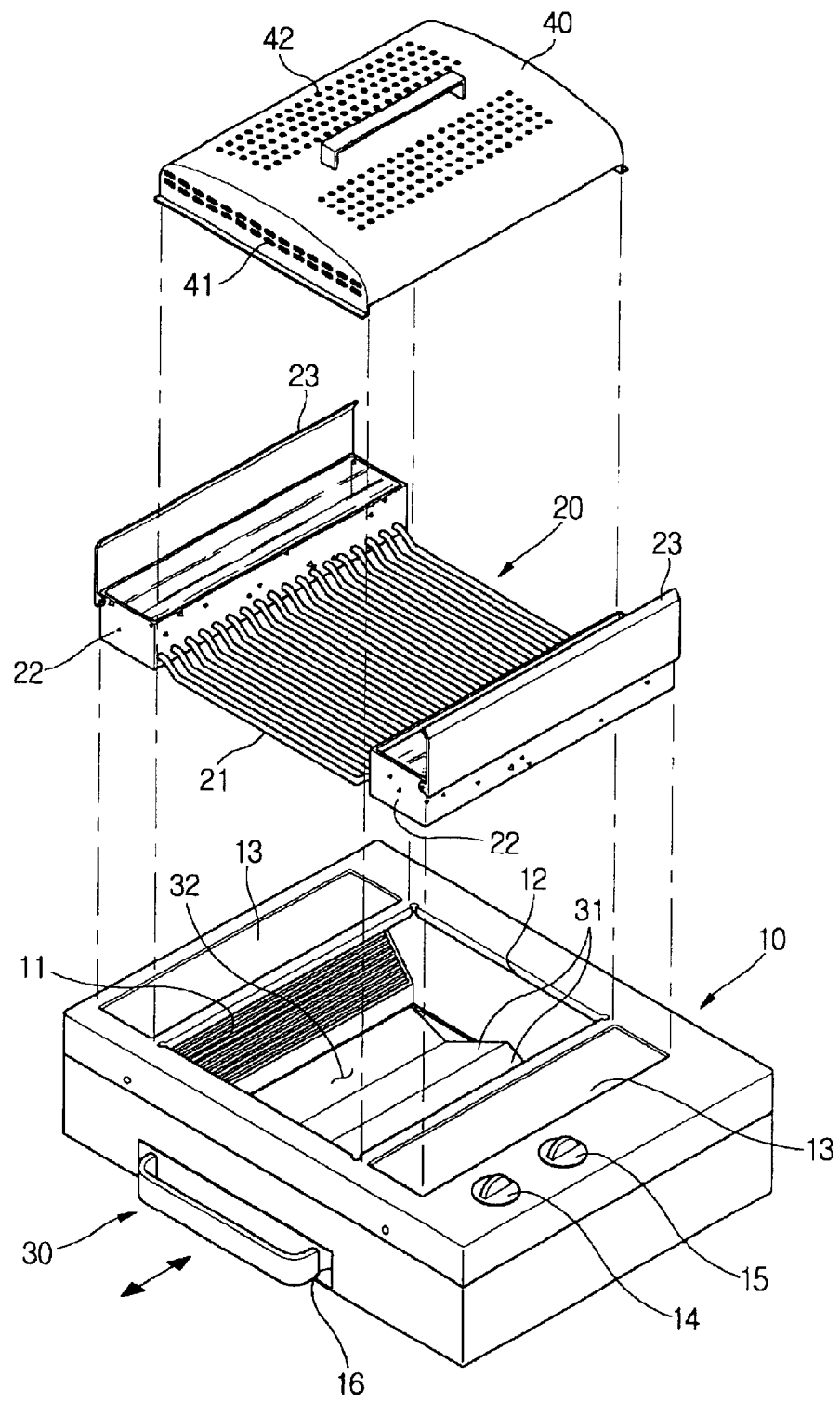
FIG. 1 is an exploded perspective view of a cooking apparatus with a grill unit according to the present invention.

Hereinafter, embodiments of the present invention will be described in detail with reference to the attached drawings, wherein the like reference numerals refer to the like elements throughout. The present invention may, however, be embodied in many different forms and should not be construed as being limited to the embodiment s set forth herein; rather, these embodiments are provided so that the present disclosure will be thorough and complete, and will fully convey the concept of the invention to those skilled in the art.

As shown in FIG. 1, a cooking apparatus with a grill unit according to the present invention includes a cabinet 10 formed in a box shape, and a grill unit 20 mounted on a top of the cabinet 10 to grill food put on the grill unit 20. Further, the cooking apparatus includes a plurality of heaters 11 mounted in the cabinet 10 to heat food put on the grill unit 20, a heat reflecting member 30 that guides the heat from the heaters 11 to the food on the grill unit 20 and collects oil dripping from the food, and a cover member 40 that covers the upper portion of the grill unit 20 and has a plurality of holes 41 and 42 perforated therethrough.

The cabinet 10 has an opening 12 formed in the top thereof to allow heat generated by the heaters 11 mounted in the cabinet 10 to be transferred to the grill unit 20. Grill seats 13, each with a predetermined area, are formed on both sides of the top surface of the cabinet 10 around the opening 12 to allow the grill unit 20 to be seated thereon. Further, a timer switch 14 and a power switch 15 are provided at a certain portion of a top surface of the cabinet 10 to control the heating time and the heating temperature of the heaters 11, respectively. An opening 16 is formed in a lower portion of the front of the cabinet 10 so that the heat reflecting member 30 may be moved into and out of the cabinet 10 through the opening 16, similar to the operation of a drawer.

The heaters 11 are set within both sides of the cabinet 10, that is, below the grill seats 13, to heat food put on the grill unit 20, and are inclined at a predetermined angle such that heating surfaces of the heaters 11 face the opening 12 formed in the top of the cabinet 10. The heaters 11 each include a ceramic member in which heating elements are encapsulated to generate infrared rays with a high temperature. However, the heaters 11 may be implemented as gas heaters using gas, or as trays for holding charcoal.

The heat reflecting member 30 is constructed such that its axial center portion is projected upward to form a hill shape with a triangular cross-section, and both projected surfaces form reflecting surfaces 31 to allow heat generated by the heaters 11 to be reflected to the grill unit 20 arranged above the heaters 11. Further, recesses 32 are formed at bottoms of both projected surfaces to collect oil dripping from food put on the grill unit 20. Further, although not shown in FIG. 1, a predetermined amount of water is contained in the heat reflecting member 30 to prevent the temperatures of the recesses 32 and the reflecting surfaces 31 from increasing excessively, thus preventing oil collected in the recesses 32 from burning or adhering to the recesses 32.

The grill unit 20 includes a plurality of grill pipes 21 arranged in parallel with each other while being spaced apart from each other, water tanks 22 connected to both side ends of the grill pipes 21 to supply water into the grill pipes 21 and provided with bottom surfaces seated on the grill seats 13 of the top surface of the cabinet 10, and covers 23 to selectively open and close upper portions of the water tanks 22.

Figure 3:
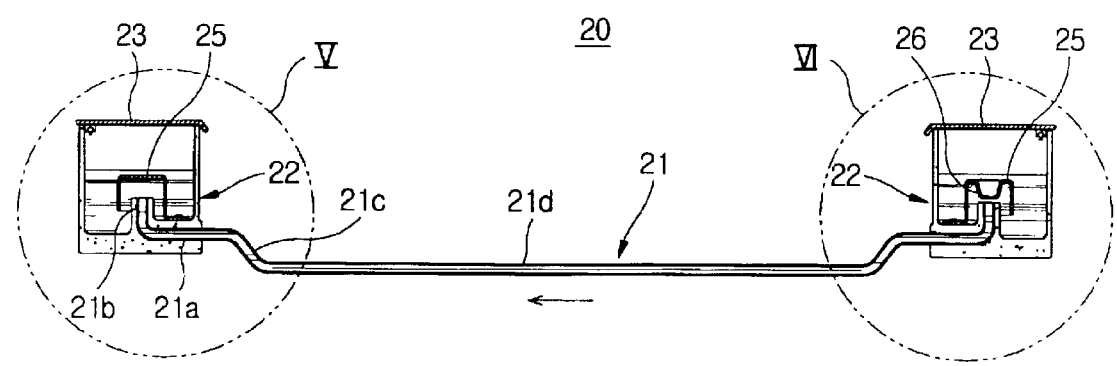
FIG. 3 is a sectional view of the grill unit taken along line III–III' of FIG. 2.
Figure 5:
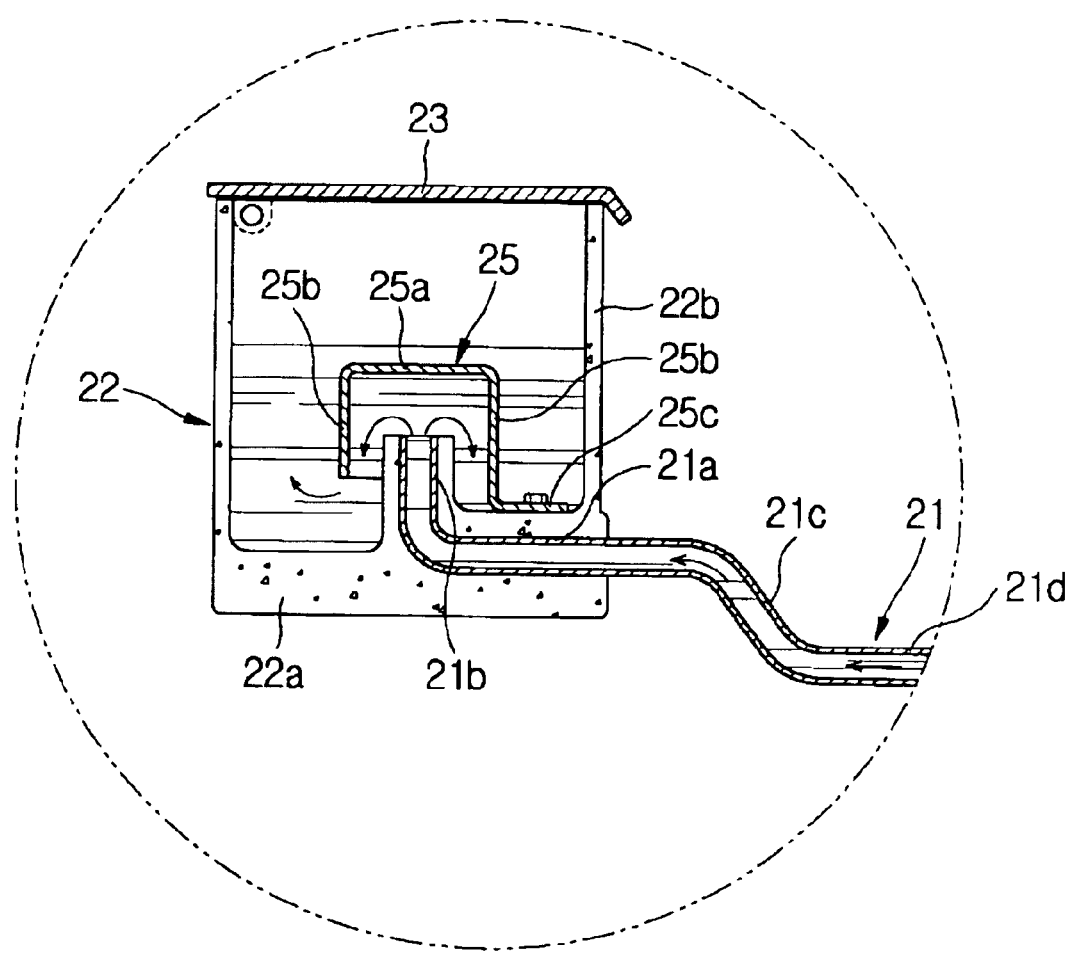
FIG. 5 is a detailed view of portion V of FIG. 3.

Further, as shown in FIG. 3, the grill unit 20 of the present invention is designed such that the grill pipes 21 are made of metallic material and the water tanks 22 on both sides thereof are manufactured through injection molding of a resin material. As shown in FIG. 5, a lower portion 22a of each of the water tanks 22, into which the grill pipes 21 are inserted, is thicker than a side portion 22b thereof. Both side ends of each of the grill pipes 21 inserted into the lower portions 22a of the water tanks 22 include a laterally extended part 21a that is laterally extended by a predetermined length, and an upwardly extended part 21b that is upwardly bent and extended from the laterally extended part 21a and open at the top thereof to interface with an inside of each of the water tanks 22. This construction reinforces the rigidity of portions where both side ends of the grill pipes 21 and the water tanks 22 are connected to each other, which are kept watertight.

As shown in FIGS. 3 and 5, each of the grill pipes 21 is provided with a horizontally extended part 21d on which food is placed. The horizontally extended part 21d is bent to be positioned lower than both side ends of the grill pipes 21 connected to the water tanks 22 so that the food is positioned near the heaters 11 arranged below the food. That is, each of the grill pipes 21 is provided with two inclined parts 21c downwardly bent at a predetermined angle and extended from end parts connected to the water tanks 22. Each of the grill pipes 21 is bent to be horizontally extended between the inclined parts 21c, so that the horizontally extended part 21d on which the food is placed is lower than the water tanks 20.

The above-described construction of the grill unit 20 prevents the grill pipes 21 from overheating by allowing water to flow into the grill pipes 21 from the water tanks 22, even though the grill pipes 21 are heated by heat transferred from the heaters 11 arranged below the grill unit 20 when the user grills food, thereby preventing the part of food in contact with the grill pipes 21 from burning.

Figure 4:
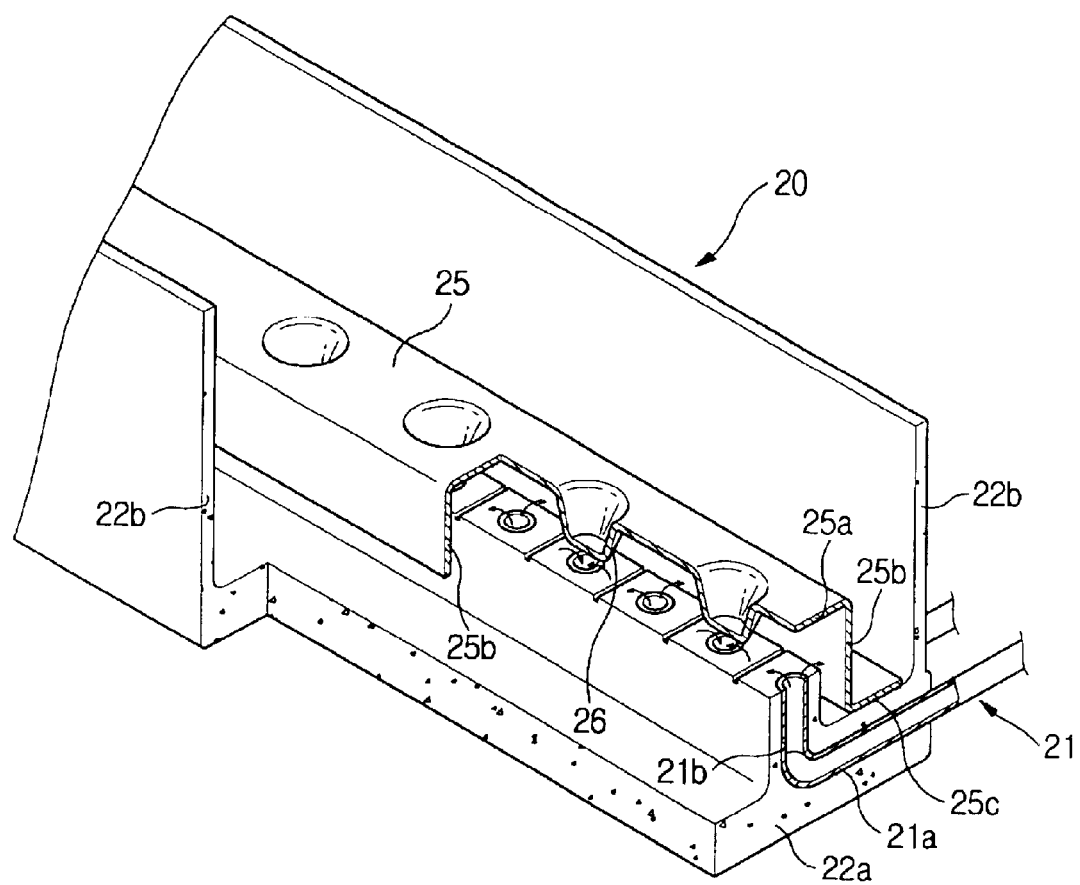
FIG. 4 is a perspective view showing the construction of a soundproofing cover of the grill unit of the present invention.

Further, as shown in FIGS. 3 to 5, soundproofing covers 25 are positioned around the ends of the grill pipes 21 while being spaced apart from the grill pipes 21 by a predetermined distance to prevent noise from being generated when water vapor, which is generated when water contained in the grill pipes 21 boils, is discharged to the water tanks 22.

Figure 6:
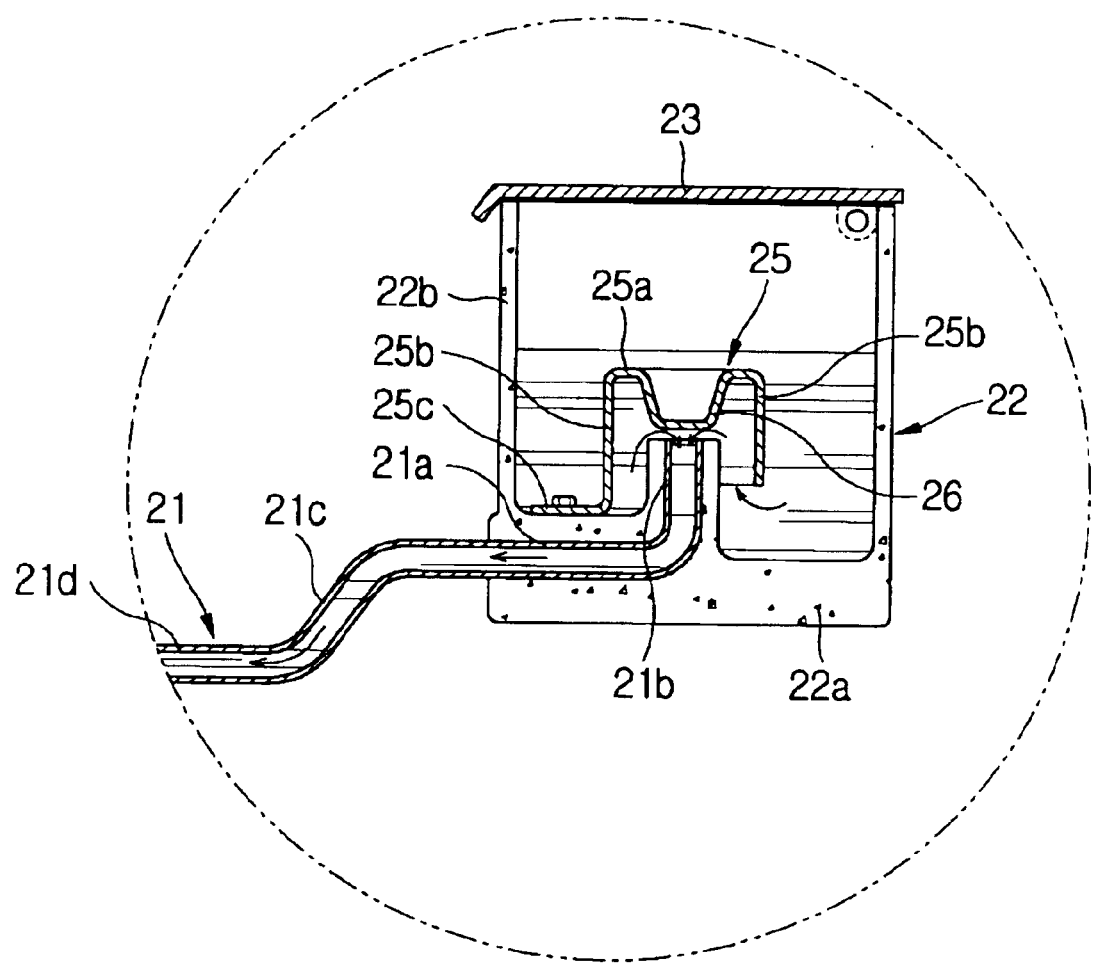
FIG. 6 is a detailed view of portion VI of FIG. 3.

As shown in FIGS. 4 to 6, the soundproofing covers 25 extend in the longitudinal direction of the water tanks 25 and are positioned around the ends of the grill pipes 21. The soundproofing covers 25 each include a top surface 25a arranged opposite to upwardly open ends of the grill pipes 21 to intercept discharged water vapor, and side surfaces 25b downwardly bent and extended from edges of the top surface 25a by a predetermined length. Further, the soundproofing covers 25 are constructed such that a fixing part 25c connected to a lower end of one of the side surfaces 25b is fixed to an inner lower surface of each water tank 22, and a lower end of the other side surface 25b is open while being spaced apart from the inner lower surface of each water tank 22 to allow water vapor to be discharged through the open end. This construction of the soundproofing covers 25 allows water vapor, discharged from the grill pipes 21 to the water tanks 22 at a predetermined pressure, to be intercepted by the soundproofing covers 25, thus reducing noise generated due to the discharge pressure. Further, this construction enables an air layer to be formed while discharged water vapor collects in the soundproofing covers 25 by a predetermined amount when the water vapor is discharged to the ends of the grill pipes 21, thereby increasing an overall soundproofing effect by the air layer.

Further, as shown in FIG. 3, the grill unit 20 of the present invention is constructed such that one of the side ends of each grill pipe 21 is partially obstructed by a projection 26 downwardly formed on the inner surface of one of the soundproofing covers 25 while being spaced apart from the projection 26 by a predetermined distance. This construction of the waterproofing covers 25 allows one side end of each grill pipe 21 to be partially obstructed by one of the projections 26, so that water vapor, generated in the grill pipe 21 when water contained in the grill pipe 21 boils, is discharged to the other side end of each grill pipe 21 that is not partially obstructed by the projection 26, thus enabling water contained in the grill pipe 21 to continuously flow in the grill pipe 21 in only one direction. Through this water flow, the construction of the soundproofing covers 25 slows the increase in temperature of the grill pipe 21 and reduces the amount of generated water vapor.

Figure 2:
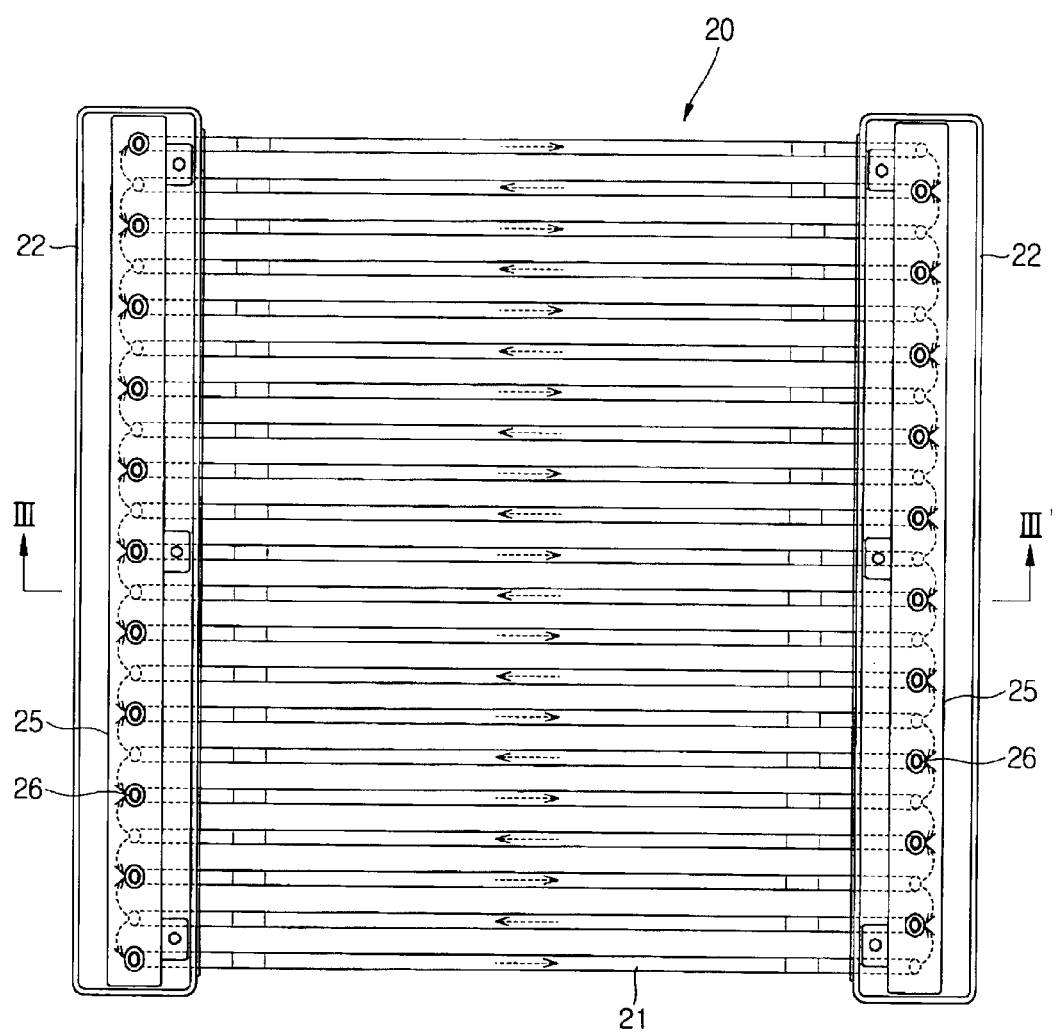
FIG. 2 is a plan view showing the construction of the grill unit of the present invention.

Further, as shown in FIG. 4, the ends of the grill pipes 21, which are arranged in a line in each water tank 22, are alternately and partially obstructed by the projections 26 downwardly formed on the soundproofing covers 25. That is, the projections 26 formed on the soundproofing covers 25 are formed at intervals corresponding to twice the distance between neighboring grill pipes 21 to alternately and partially obstruct the ends of the corresponding grill pipes 21. The soundproofing covers 25 in the water tanks 22 are formed in the same overall shape. However, as shown in FIG. 3, the projections 26 partially obstruct only one side end of each of the grill pipes 21 while being spaced apart from the one side end. As shown in FIG. 2, this construction allows water contained in neighboring grill pipes 21 to flow in opposite directions (in the directions indicated by arrows in FIG. 2), thus enabling water to be continuously circulated while maintaining the water levels of both the water tanks 22.

Figure 7:
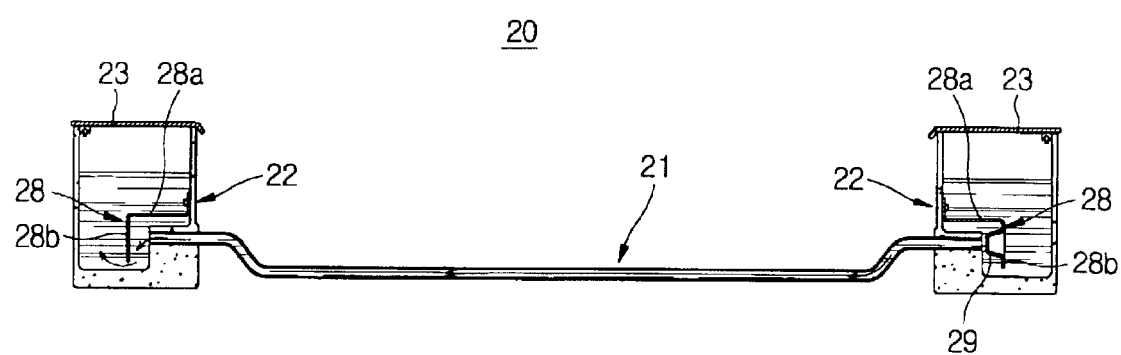
FIG. 7 is a sectional view of showing the construction of a grill unit, according to another embodiment of the present invention.

FIG. 7 illustrates another embodiment of the grill unit 20 of the present invention. In the embodiment shown in FIG. 7, both open side ends of each grill pipe 21 face side surfaces of the water tanks 22, respectively, and soundproofing covers 28 are positioned around both side ends of each grill pipe 21. The soundproofing covers 28 each include a top surface 28a and a side surface 28b. The top surface 28a is fixed to one side surface of the water tank 22, while being positioned over an upper surface of an end portion of each grill pipe 21 to intercept water vapor discharged from each grill pipe 21. The side surface 28b is downwardly bent and extended from the top surface 28a to be opposite the open end of each grill pipe 21, and is open at a lower end thereof. A projection 29 is formed on the side surface 28b of one of the soundproofing covers 28 to partially obstruct one side end of each grill pipe 21, while being spaced apart from the one side end thereof. Each projection 29 is arranged as described above in the first embodiment to obtain the same water-cooling effect as the above embodiment.

As is apparent from the above description, the present invention provides a grill unit and cooking apparatus with the same, which reduces noise generated due to discharged water vapor through the use of soundproofing covers installed within water tanks, even though water vapor generated in grill pipes is discharged to the water tanks, thus preventing noise from being generated.

Further, the present invention is advantageous in that the grill unit continuously circulates water contained in neighboring grill pipes, while allowing the water to flow in the grill pipes in opposite directions, to slow the increase in temperature of the grill pipes, which reduces the amount of water vapor generated in the grill pipes and reduces noise generated.

Although preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A grill unit, comprising:
    a plurality of grill pipes, each grill pipe having two ends;
    water tanks connected to both ends of the grill pipes to supply water to the grill pipes; and
    soundproofing covers positioned around both ends of the grill pipes that are inserted into the water tanks.

2. The grill unit according to claim 1, further comprising a plurality of projections formed on an inner surface of each of the soundproofing covers, wherein one of the ends of each of the grill pipes is partially obstructed by a corresponding one of the projections while being spaced apart from the corresponding projection to enable water contained in each grill pipe to flow therein in one direction.

3. The grill unit according to claim 2, wherein the ends of the plurality of grill pipes are alternately and partially obstructed by the corresponding projections, the plurality of projections being alternately arranged in both of the water tanks.

4. The grill unit according to claim 1, wherein:
    both ends of the grill pipes, which are open, face top surfaces of the water tanks; and
    the soundproofing covers each comprise a top surface opposite the open ends of the grill pipes to intercept water vapor discharged from the grill pipes, and at least one side surface downwardly bent and extended from an edge of each top surface by a predetermined length and open at a lower end thereof.

5. The grill unit according to claim 1, wherein:
    both ends of the grill pipes, which are open, face side surfaces of the water tanks; and
    the soundproofing covers each comprise a top surface positioned over upper surfaces of the ends of the grill pipes to intercept water vapor discharged from the grill pipes, and a side surface opposite the open ends of the grill pipes and open at a lower end thereof.

6. The grill unit according to claim 5, further comprising a plurality of projections formed on a side surface of one of the soundproofing covers, wherein one of the ends of each of the grill pipes is partially obstructed by a corresponding one of the projections while being spaced apart from the corresponding projection to enable water contained in each grill pipe to flow therein in one direction.

7. The grill unit according to claim 1, wherein each of the water tanks comprises a cover installed on an open upper portion thereof to selectively open and close each of the water tanks.

8. The grill unit according to claim 1, wherein each of the soundproofing covers extends in a longitudinal direction to the water tanks and are positioned around the ends of the plurality of grill pipes inserted into the water tanks.

9. A cooking apparatus with a grill unit, comprising:
a cabinet having at least one heater; and
a grill unit mounted on a top surface of the cabinet to support food, the grill unit having a plurality of grill pipes, water tanks connected to both ends of the grill pipes to supply water to the grill pipes, and soundproofing covers positioned around both ends of the grill pipes that are inserted into the water tanks.

10. The cooking apparatus according to claim 9, further comprising a plurality of projections formed on an inner surface of each of the soundproofing covers, wherein one of the ends of each of the grill pipes is partially obstructed by a corresponding one of the projections while being spaced apart from the corresponding projection to enable water contained in each grill pipe to flow therein in one direction.

11. The cooking apparatus according to claim 10, wherein the ends of the plurality of grill pipes are alternately and partially obstructed by the corresponding projections, the plurality of projections being alternately arranged in both of the water tanks.

12. The cooking apparatus according to claim 10, wherein the projections are formed at intervals corresponding to twice the distance between adjacent grill pipes to alternately and partially obstruct the ends of the grill pipes.

13. The cooking apparatus according to claim 9, wherein:
both ends of the grill pipes, which are open, face top surfaces of the water tanks; and
the soundproofing covers each comprise a top surface opposite the open ends of the grill pipes to intercept water vapor discharged from the grill pipes, and at least one side surface downwardly bent and extended from an edge of each top surface by a predetermined length and open at a lower end thereof.

14. The cooking apparatus according to claim 9, wherein:
both ends of the grill pipes, which are open, face side surfaces of the water tanks; and
the soundproofing covers each comprise a top surface positioned over upper surfaces of the ends of the grill pipes to intercept water vapor discharged from the grill pipes, and a side surface opposite the open ends of the grill pipes and open at a lower end thereof.

15. The cooking apparatus according to claim 9, wherein each of the water tanks comprises a cover installed on an open upper portion thereof to selectively open and close each of the water tanks.

16. The cooking apparatus according to claim 9, wherein each of the soundproofing covers extends in a longitudinal direction to the water tanks and are positioned around the ends of the plurality of grill pipes inserted into the water tanks.

17. The cooking apparatus according to claim 9, wherein each side of each grill pipe comprises:
a laterally extended part; and
an upwardly extended part that is upwardly bent and extended from the laterally extended part and open at a top thereof to interface with an inside of a corresponding one of the water tanks to reinforce the rigidity of portions of each grill pipe connected to the corresponding water tank.

18. The cooking apparatus according to claim 17, wherein each grill pipe comprises:
inclined parts at respective sides of each grill pipe, each inclined part being downwardly bent at a predetermined angle and extended from respective laterally extended parts; and
a horizontally extended part on which food is placed, sides of which extending from respective inclined parts, the horizontally extended part being positioned lower than the respective water tanks to place the food near the at least one heater.

19. The cooking apparatus according to claim 9, wherein each soundproofing cover comprises:
side surfaces; and
a fixing part having one end connected to a lower end of one of the side surfaces and another end connected to an inner lower surface of a respective one of the water tanks, another one of the side surfaces having an open lower end that is spaced apart from the inner lower surface of the respective water tank to allow water vapor to be discharged through the open lower end,
wherein an air layer forms as the discharged water vapor collects in the soundproofing covers to increase a level of soundproofing.

20. A grill unit, comprising:
a plurality of grill pipes, each grill pipe having two ends;
water tanks connected to both ends of the grill pipes to supply water to the grill pipes, both ends of the grill pipes facing side surfaces of the water tanks; and
soundproofing covers positioned around both ends of the grill pipes that are inserted into the water tanks, the soundproofing covers each comprising a top surface positioned over upper surfaces of respective ends of the grill pipes to intercept water vapor discharged from the grill pipes, and a side surface opposite the respective ends of the grill pipes and open at a lower end thereof,
wherein the grill pipes are prevented from overheating by allowing water to flow into the grill pipes from the water tanks, thereby preventing food contacting the grill pipes from burning when the grill pipes are heated and slowing an increase in temperature of the grill pipes to reduce an amount of water vapor generated, and
wherein the soundproofing covers positioned around the ends of the grill pipes and spaced apart from the grill pipes prevent noise from being generated when water vapor, which is produced in the grill pipes when water in the grill pipes boils, discharges to the water tanks at a discharge pressure.

21. The grill unit according to claim 20, wherein the grill pipes are made of a metallic material and the water tanks are manufactured by injection molding of a resin material.

22. The grill unit according to claim 20, wherein each water tank has a lower portion and a side portion, with the lower portion being thicker than the side portion.

23. The grill unit according to claim 20, wherein water continuously circulates in the grill pipes, while flowing in opposite directions in each pair of adjacent grill pipes, to slowing an increase in temperature of the grill pipes when the grill pipes are heated, thereby reducing the water vapor generated in the grill pipes and reducing the noise generated.

* * * * *